(12) United States Patent
Palitzsch

(10) Patent No.: US 10,060,010 B2
(45) Date of Patent: Aug. 28, 2018

(54) HYDROMETALLURGICAL PROCESS FOR RECOVERY OF METALS AND/OR SEMIMETALS FROM WASTE MATERIALS CONTAINING COMPOUND SEMICONDUCTOR MATERIALS AND/OR BACK CONTACT MATERIALS AND/OR TRANSPARENT ELECTRICALLY CONDUCTING OXIDES (TCOS)

(71) Applicants: Ulrich Loser, Rosswein / OT Grunau (DE); Wolfram Palitzsch, Freiberg (DE)

(72) Inventor: Wolfram Palitzsch, Freiberg (DE)

(73) Assignees: Ulrich Loser, Rosswein/OT Grunau (DE); Wolfram Palitzsch, Freiberg (DE)

( * ) Notice: Subject to any disclaimer, the term of this patent is extended or adjusted under 35 U.S.C. 154(b) by 106 days.

(21) Appl. No.: 14/768,767

(22) PCT Filed: Feb. 25, 2014

(86) PCT No.: PCT/DE2014/100066
§ 371 (c)(1),
(2) Date: Aug. 19, 2015

(87) PCT Pub. No.: WO2014/131401
PCT Pub. Date: Sep. 4, 2014

(65) Prior Publication Data
US 2016/0002750 A1    Jan. 7, 2016

(30) Foreign Application Priority Data
Feb. 26, 2013  (DE) .................. 10 2013 003 156

(51) Int. Cl.
| | | |
|---|---|---|
| C22B 3/06 | (2006.01) | |
| C22B 3/08 | (2006.01) | |
| C22B 3/16 | (2006.01) | |
| C22B 7/00 | (2006.01) | |
| C22B 58/00 | (2006.01) | |
| G06F 3/01 | (2006.01) | |
| G06F 3/0485 | (2013.01) | |
| C22B 15/00 | (2006.01) | |
| C22B 34/34 | (2006.01) | |

(52) U.S. Cl.
CPC ............. *C22B 58/00* (2013.01); *C22B 3/06* (2013.01); *C22B 3/08* (2013.01); *C22B 3/16* (2013.01); *C22B 3/165* (2013.01); *C22B 7/006* (2013.01); *C22B 15/0071* (2013.01); *C22B 34/34* (2013.01); *G06F 3/013* (2013.01); *G06F 3/0485* (2013.01); *Y02P 10/234* (2015.11)

(58) Field of Classification Search
CPC .. C22B 3/08; C22B 3/165; C22B 3/06; C22B 7/006
See application file for complete search history.

(56) References Cited

U.S. PATENT DOCUMENTS

| | | |
|---|---|---|
| 4,650,553 A | 3/1987 | Felgendreger et al. |
| 4,957,653 A | 9/1990 | Cordani |
| 5,017,267 A | 5/1991 | Cordani |
| 5,505,872 A | 4/1996 | Krulik |
| 5,755,950 A | 5/1998 | Bell |
| 2012/0045898 A1 | 2/2012 | Uozumi |
| 2015/0322545 A1* | 11/2015 | Chen .................. H05K 3/22 75/744 |
| 2016/0053343 A1* | 2/2016 | Palitzsch ............... C22B 3/16 75/744 |

FOREIGN PATENT DOCUMENTS

| | | |
|---|---|---|
| EP | 1050604 A1 | 11/2000 |
| RU | 2012120959 A | 11/2013 |
| WO | 2008102240 A1 | 8/2008 |
| WO | 2014076544 A1 | 5/2014 |

OTHER PUBLICATIONS

Guo, Jiuyong et al. "Recycling of Non-Metallic Fractions from Waste Printed Circuit Boards: A Review." Journal of Hazardous Materials. vol. 168 pp. 567-590. (Year: 2009).*
Zhenghui Wu et al.: The Kinetics of Leaching Galena Concentrates with Ferric Methanesulfonate Solution, Hydrometallurgy, vol. 142, Dec. 11, 2013, pp. 121-130, XP05513063, ISSN: 0304-386X, DOI: 10.1016/j.hydromet.2013.10.017 "1. Introduction"; "2. Materials and Methods".

* cited by examiner

Primary Examiner — George Wyszomierski
Assistant Examiner — Tima M McGuthry-Banks
(74) Attorney, Agent, or Firm — Michael Soderman

(57) ABSTRACT

A hydrometallurgical process for recovery of metals and/or semimetals from waste materials, such as high-tech or green-tech wastes, and/or electrical and electronic waste containing compound semiconductor materials and/or back contact materials and/or transparent electrically conducting oxides (TCOs), wherein the waste materials according to the invention are mixed thoroughly with a reaction solution of water, 1 to 5% by mass sodium bisulphate and 1-5% by mass sodium chlorite or with a reaction solution of water, 1 to 50% by mass organosulphonic acid and in the stoichiometric ratio to the organosulphonic acid 1-5% by mass of an oxidizing agent, and the metals and/or semimetals that are to be recovered are dissolved.

12 Claims, No Drawings

HYDROMETALLURGICAL PROCESS FOR RECOVERY OF METALS AND/OR SEMIMETALS FROM WASTE MATERIALS CONTAINING COMPOUND SEMICONDUCTOR MATERIALS AND/OR BACK CONTACT MATERIALS AND/OR TRANSPARENT ELECTRICALLY CONDUCTING OXIDES (TCOS)

CROSS-REFERENCE TO RELATED APPLICATIONS

This application is the U.S. national stage of International Application No. PCT/DE2014/100066 filed on Feb. 25, 2014, and claims the benefit thereof. The international application claims the benefit under 35 USC 119 of German Application Nos. DE 10 2013 003 156.7 filed on Feb. 26, 2013; and DE 10 2013 009 568.7 filed on Feb. 26, 2013; all applications are incorporated by reference herein in their entirety.

BACKGROUND

The present invention relates to a hydrometallurgical method for recovery of metals and/or semimetals from waste materials containing compound semiconductor materials and/or back contact materials and/or transparent electrically conducting oxides (TCO's) and therefore a wet chemical method for recovery of metals, which often occur only in low concentration, inter alia, as typical III-V, II-VI, or I-II-VI$_2$ compound semiconductor materials in high-tech or green-tech wastes, or electrical and electronic wastes, but also as back contacts, such as molybdenum, or as front contacts, such as TCO's (transparent, electrically conductive oxides). Without elements such as indium, gallium, arsenic, cadmium, tellurium, molybdenum, copper, silver, and selenium, for example, photovoltaic plants, modern Tablet PCs, and smart phones are not conceivable, wherein the listed metals are often processed as intermediates, for example, as gallium arsenide (GaAs) and thus have completely different properties than displayed by the elements of which they consist. For this variety of materials, which are essential for our present innovative products, there is not yet a universal solution relating to the recovery of production wastes and end-of-life products. In addition to silicon-based photovoltaic technologies, there are presently a variety of other PV wastes, based on thin-film technologies using copper-indium-diselenide (CIS), copper-indium-gallium-diselenide (GIGS), cadmium telluride (CdTe), and gallium arsenide (GaAs). The economic significance of the recycling of PV modules and the renewed use linked thereto of these materials has become an important theme in the meantime.

However, the dissipative use of many special materials in countless products (thin-film photovoltaic modules, mobile telephones, flat screen displays, etc.) makes recycling more difficult and only permits recovery in recycling loops up to a certain degree. Focusing on included valuable metals all too often rapidly has the result that the processing thereof may not be performed cost-effectively, in particular because a specific introduction of energy having corresponding costs is presently to be taken into consideration. However, if synergies are included, universal methods are applied, and an attempt is made for a recovery method which can convert every component of the respective waste into products as much as possible, there are good chances for establishing economically successful recycling.

In addition, official regulations, for example, the new German "Law on Life-Cycle Management" are often applied to a maximum quota for the recycling—in the case of a minimum usage of resources (for example, energy and raw materials). Furthermore, new guidelines are being worked on all over Europe for high-tech and green tech products, such as the compulsory guidelines of the European Parliament and directive on waste electrical and electronic equipment (WEEE directive). These comprehensively regulate the correct recycling of waste electrical and electronic equipment, including the financing thereof by the producers—and in future also the recycling of photovoltaic modules.

In addition, interest in cost-effective recycling methods has been generated from these developments.

With regard to the eco-toxicity of the participating materials, it is noteworthy that toxic elements, such as arsenic or cadmium, play a significant role both in PV modules and also in communication equipment.

It is all the more important to offer environmentally-friendly recycling methods for production wastes or defective or discarded products, which is the goal of the present invention.

Presently, cadmium-telluride waste is processed in the USA and Malaysia, wherein the method is described as very complex (U.S. Pat. No. 5,453,111). The skimming off of plastic after a hot nitric acid treatment of pulverized modules does not represent a good economic and ecological solution. Thermal treatment (pyrolysis) and the removal of some metals in the gas phase (EP 1187224 B1) also will not result in a cost-effective method. A method for reclaiming exclusively cadmium and tellurium is described in U.S. Pat. No. 6,391,165 B1, while German patent specification DE 102008058530 before only deals with so-called chalcopyrites. All of these processes are only directed to individual semiconductor types in each case and exclusively treat photovoltaic materials. A recycling option for wastes containing gallium-arsenide has heretofore been completely lacking.

SUMMARY

The present invention relates to a hydrometallurgical process for recovery of metals and/or semimetals from waste materials, such as high-tech or green-tech wastes, and/or electrical and electronic waste containing compound semiconductor materials and/or back contact materials and/or transparent electrically conducting oxides (TCOs), wherein the waste materials according to the invention are mixed thoroughly with a reaction solution of water, 1 to 5% by mass sodium bisulphate and 1-5% by mass sodium chlorite or with a reaction solution of water, 1 to 50% by mass organosulphonic acid and in the stoichiometric ratio to the organosulphonic acid 1-5% by mass of an oxidizing agent, and the metals and/or semimetals that are to be recovered are dissolved.

DETAILED DESCRIPTION

The object of the invention is to overcome the disadvantages of the prior art and to develop an extremely versatile hydrometallurgical method for recovery of metals (and also semimetals) from waste materials containing compound semiconductor materials and/or back contact materials and/or transparent electrically conducting oxides (TCO's), in particular III-V, II-VI, or I-II-VI$_2$ compound semiconductor materials from different high-tech or green-tech wastes, or electrical and electronic wastes, but also as back contacts, such as molybdenum, or as front contacts, such as TCO's, wherein the above-described semiconductor-containing wastes are treated by suitable liquid reaction partners so that the valuable semiconductor materials (metals) are elegantly dissolved and simultaneously concentrated for further processing. At the same time, the method is to operate efficiently, in an energy-saving manner, and so that it protects the environment.

The object is achieved according to the invention by the characterizing features of the first patent claim.

Advantageous embodiments result from the dependent claims.

The hydrometallurgical method is used for the recovery of metals and/or semimetals (only referred to as metals hereafter) from waste materials which contain compound semiconductor materials and/or
back contact materials and/or
transparent electrically conducting oxides (TCO's), in particular for the recovery of metals/semimetals from waste materials such as high-tech or green-tech wastes, or electrical and electronic wastes, wherein the waste materials are mixed according to the invention with a reaction solution made of either water, 1 to 5 mass-% sodium bisulfate, and 1 to 5 mass-% sodium chlorite, or
water, 1 to 50 mass-% organo-sulfonic acid and 1 to 5 mass-% of an oxidizing agent in stoichiometric ratio to the organo-sulfonic acid, and the metals and/or semimetals to be recovered are dissolved.

The waste materials can also be formed, for example, from industrial wastes or production wastes and can also only contain metals or metal compounds which are to be recovered.

Furthermore, the metals or waste materials to be recovered can be deposited on a carrier matrix of the waste materials or can also be a complete component, which additionally also contains other component-typical materials, for example, glass or plastic. In this case, after completion of the dissolving process of the metals to be recovered from the carrier matrix and transition into the reaction solution, the polymetallic reaction solution, which is enriched with the elements of the metals to be recovered which have entered solution, from the solid carrier matrix, from which the pollutants have been removed, and the carrier matrix freed of the materials to be recovered is subsequently washed with water.

Using the method according to the invention, metals and semimetals can be recovered from greatly varying waste materials, wherein the semimetals are also to be understood under the term metals hereafter. The present invention therefore relates to a highly versatile hydrometallurgical method for the treatment of wastes containing in particular III-V, II-VI, or I-II-VI$_2$ semiconductors, which may also be applied similarly for the extraction of electrical or electronic wastes, rear contacts, such as molybdenum, front contacts, such as ITO, but also to all non-silicon based thin-film photovoltaic wastes, to recover metals (or semimetals), for example, Cd, Cu, Mo, Se, In, Ga, As, Se, Te, etc. from the waste materials.

Using this new universal method, the disadvantages of previously applied methods, namely the restriction to individual solutions which are not transferable, the long time for the leaching processes and the risk of the formation of highly toxic gases, such as nitrous gases or metal halid compounds, are overcome.

If needed, the wastes are pulverized before the hydrometallurgical treatment so that the semiconductor materials become accessible to a liquid. It does not play a role in this case how large the individual parts are at the end before the hydrometallurgical treatment. The wastes containing semiconductors which are prepared in this manner are subsequently supplied to the hydrometallurgical treatment.

In one method variant, according to the invention, the waste material is wetted using water in the first step so that it is coated with water. The water temperature is the normal ambient temperature or less in this case, if it was taken from a cold line. Temperature increases result in a reaction acceleration according to the invention.

1 to 5 mass-% sodium bisulfate in relationship to the water is now added to this bath. Immediately following this, sodium chlorite is added (preferably in undissolved form) by simply scattering it in, upon which the immediate dissolving of the semiconductor layers begins. Thorough mixing of the reaction solution with the wastes to be treated encourages the dissolving of the semiconductor layers/metals and can be achieved by simple recirculation pumping of the liquid within the reaction batch. After a short contact time, the materials/metals to be recovered have entered solution and the solid phase is separated from the liquid phase if needed. After the removal of the liquid phase by, for example, drainage or filtration, the remaining carrier matrix of the waste materials (usually plastic and/or glass) is washed with preferably clear water. The washing water can then be temporarily stored as existing water for new batches and used further.

The drained polymetallic solution can be used multiple times until the dissolving capacity decreases or until reaching saturation and is available for further processing by corresponding special firms as a concentrate after ending the process. A further alternative possibility has been found, which acts similarly, is not to be performed substantially differently, and is capable of dissolving semiconductor materials/metals similarly, rapidly, and effectively and therefore can be used as an extraction means for the above-described wastes.

In a further method variant 2 according to the invention, pure methylsulfonic acid (MSS) is added as a solid to the above-described wetting bath, preferably at 15-20 mass-% in relation to the water. The solid dissolves immediately while generating heat. Then, in stoichiometric ratio to the already provided methylsulfonic acid, 1 to 5 mass-% of an oxidizing agent (in dissolved or undissolved form) is added, to suppress the formation of toxic metal halide compounds and accelerate the dissolving of the semiconductor materials. Perborates, percarbonates, hypochlorites, and/or peroxides are used as the oxidizing agents. The possibility optionally exists of not using the employed chemicals in solid form for the process, but rather using them as an aqueous solution. Still more rapid dissolving behavior of the metal/semiconductor layers can be observed here, however, this method requires enough space to dissolve the chemicals accordingly and keep them ready for use. A further advantage of the use of the salts in solid form is the long recirculation of the mother solution, since only the solid substances must be supplemented to form a uniform volume of liquid as reaction partners.

The strongly oxidative character of this reaction prevents the occurrence of undesired and hazardous metal halide compounds. Optionally, the reaction time can be shortened accordingly by increasing the temperature of the reaction solution. It is important that the carrier material matrix is always completely wetted or coated by the reaction solution.

The remaining carrier material matrix of the waste materials is washed, preferably with clear water, and subsequently dried and can therefore also be made available for further use.

The resulting polymetallic solution can advantageously be returned into the reaction batch until complete saturation of the solution by the dissolved semiconductor materials/metals. For this purpose, it is advantageous if, before the polymetallic solution is returned into the reaction process, an analysis of the saturation and a percentage addition of the reagents adapted thereto are performed.

The present invention discloses a recycling method in particular for typical III-V, II-VI, or I-II-VI$_2$ compound semiconductor materials and/or back contact materials (such as molybdenum) or front contacts and/or TCO's, as occur in high-tech and green-tech wastes, and also electrical and electronic wastes, but also in all thin-film photovoltaic wastes which are not based on silicon. The method runs at room temperature, consumes little energy, and is applicable above all to very many different waste material streams.

The method according to the invention enables these valuable semiconductor materials/metals and/or TCO's to be dissolved/recovered elegantly from the above-described waste materials, which contain semiconductors/metals, by way of suitable liquid reaction partners and at the same time to be concentrated for further processing, separated, and stored. The carrier material freed of the metals is either disposed of or utilized in another manner.

For the first time, an efficient and universal wet chemical method for the recovery of metals, which often occur only in low concentration, inter alia, as typical III-V, II-VI, or I-II-VI$_2$ compound semiconductor materials in high-tech or green-tech wastes, or electrical and electronic wastes, as back contacts, such as molybdenum, or front contacts, such as TCO's, but also in all thin-film photovoltaic wastes which are not based on silicon, is provided by the present invention.

For this purpose, in an advantageous method variant, the mechanically pretreated wastes are coated with water and subsequently contacted with sodium bisulfate and sodium chlorite or organo-sulfonic acid and an oxidizing agent, whereby the typical III-V, II-VI, or I-II-VI$_2$ compound semiconductor materials and/or back contact materials, for example, molybdenum and/or TCO's go into solution. The separation of the solid phase from the liquid phase and the further treatment are subsequently performed.

In this case, semimetals such as arsenic, selenium, tellurium, etc. are also dissolved from the waste materials by the method according to the invention. The invention is to be explained in greater detail on the basis of exemplary embodiments.

DETAILED DESCRIPTION OF THE PREFERRED EMBODIMENTS

Exemplary Embodiment 1

A flat piece of waste material, which was 5 cm×12.5 cm in size and was coated with typical indium and gallium semiconductors (approximately 5 g semiconductor coating/m$^2$) was coated with 1.3 g water. Firstly 15 mg pure methylsulfonic acid in crystal form and then one drop of 30% hydrogen peroxide solution were added thereto. After 10 minutes of action time, the semiconductor coating was completely dissolved. The individual quantities of the dissolved elements of the 62.57 cm$^2$ large surface were ascertained from the analysis of the polymetallic solution: Cd: 0.4 mg, Cu: 3.5 mg, Mo: 8.19 mg, Se: 12.35 mg, In: 5.2 mg, Ga: 1.3 mg.

Exemplary Embodiment 2

A flat piece of waste material, which was 10 cm×12.5 cm in size and was coated with typical indium and gallium semiconductors (approximately 5 g semiconductor coating/m$^2$) was coated with 15 g water. Firstly 150 mg sodium bisulfate was scattered there on and then 120 mg sodium chlorite. After 10 minutes of action time, the semiconductor coating was completely dissolved. The analysis of the solution resulted in the following contents: Cd: 37 mg/L, Cu: 350 mg/L, Mo: 1100 mg/L, Se: 1200 mg/L, In: 570 mg/L, Ga: 140 mg/L.

Exemplary Embodiment 3

A waste splinter, 11.77 g in weight, made of GaAs (gallium arsenide), was coated with 80 mL water. After adding 20 g solid pure methylsulfonic acid and three drops of 35% hydrogen peroxide, the rapid dissolving of the GaAs could be observed. After 10 minutes, the piece had entered solution. The analysis of the solution indicated the following metal contents: As: 61.9 g/L and Ga: 56.8 g/L.

The invention claimed is:

1. A hydrometallurgical method for the recovery of metals and/or semimetals from waste materials containing materials selected from the group consisting of
   compound semiconductor materials,
   back contact materials and
   transparent electrically conducting oxides,
   characterized in that
   the waste materials are mixed with a reaction solution made of
      water, 1 to 5 mass-% sodium bisulfate, and 1 to 5 mass-% sodium chlorite,
   and the metals and/or semimetals to be recovered are dissolved.

2. The hydrometallurgical method according to claim 1, characterized in that, when a carrier matrix is present in the waste materials, a polymetallic solution is formed from the mixture of the waste materials and the reaction solution, the metals are dissolved into the reaction solution from the carrier matrix, a polymetallic solution is formed from the dissolved metals, the reaction solution, and the waste materials, and the carrier matrix is washed using water.

3. The hydrometallurgical method according to claim 2, characterized in that the washed carrier matrix and washing water are disposed of separately, and the washing water is temporarily stored for a new batch of the method.

4. The hydrometallurgical method according to claim 2, characterized in that the polymetallic solution is always returned to a reaction batch until complete saturation.

5. The hydrometallurgical method according to claim 4, characterized in that before the return of the polymetallic solution to the reaction batch, an analysis of the saturation and a rebalancinq of the composition of the reaction solution are performed.

6. A hydrometallurgical method for the recovery of metals and/or semimetals from waste materials containing materials selected from the group consisting of
   compound semiconductor materials and
   transparent electrically conducting oxides,
   characterized in that
   the waste materials are mixed with a reaction solution made of
      water, 1 to 50 mass-% organo-sulfonic acid and 1 to 5 mass-% of an oxidizing agent in stoichiometric ratio to the organo-sulfonic acid, and the metals and/or semimetals to be recovered are dissolved.

7. The hydrometallurgical method according to claim 6, characterized in that, when a carrier matrix is present in the waste materials, a polymetallic solution is formed from the mixture of the waste materials and the reaction solution, the metals are dissolved into the reaction solution from the carrier matrix, a polymetallic solution is formed from the dissolved metals, the reaction solution, and the waste materials, and the carrier matrix is washed using water.

8. The hydrometallurgical method according to claim 7, characterized in that the washed carrier matrix and washing water are disposed of separately, and the washing water is temporarily stored for a new batch of the method.

9. The hydrometallurgical method according to claim 7, characterized in that the polymetallic solution is always returned to a reaction batch until complete saturation.

10. The hydrometallurgical method according to claim 9, characterized in that before the return of the polymetallic solution to the reaction batch, an analysis of the saturation and a rebalancinq of the composition of the reaction solution are performed.

11. The hydrometallurgical method according to claim 6, characterized in that pure organo-sulfonic acid in the form of methylsulfonic acid is added to the reaction solution.

12. The hydrometallurgical method according to claim 6, characterized in that perborates, percarbonates, hypochlorites, or peroxides are used as the oxidizing agent.

* * * * *